US012225156B2

(12) United States Patent
Meriaz et al.

(10) Patent No.: US 12,225,156 B2
(45) Date of Patent: Feb. 11, 2025

(54) CALL CONTROL FOR PROVIDING TARGETED CONTENT

(71) Applicant: MBTE Holdings Sweden AB, Gothenburg (SE)

(72) Inventors: Ran Meriaz, Atlanta, GA (US); Yoram Meriaz, Tel-Aviv (IL); Alexander Tkachman, Holon (IL)

(73) Assignee: MBTE Holdings Sweden AB, Gothenburg (SE)

( * ) Notice: Subject to any disclaimer, the term of this patent is extended or adjusted under 35 U.S.C. 154(b) by 0 days.

(21) Appl. No.: 17/651,434

(22) Filed: Feb. 17, 2022

(65) Prior Publication Data

US 2022/0263941 A1 Aug. 18, 2022

Related U.S. Application Data

(60) Provisional application No. 63/200,141, filed on Feb. 17, 2021.

(51) Int. Cl.
*H04M 3/00* (2024.01)
*G06N 20/00* (2019.01)
(Continued)

(52) U.S. Cl.
CPC .......... *H04M 3/4217* (2013.01); *G06N 20/00* (2019.01); *G10L 25/78* (2013.01);
(Continued)

(58) Field of Classification Search
CPC ......... H04M 3/42059; H04M 3/42042; H04M 3/493; H04M 3/42153; H04M 3/436;
(Continued)

(56) References Cited

U.S. PATENT DOCUMENTS 6,141,413 A * 10/2000 Waldner ................. H04M 3/51
379/88.17
7,613,448 B2 * 11/2009 Yanagisawa ...... H04M 1/72445
713/169

(Continued)

OTHER PUBLICATIONS

International Search Report and Written Opinion for International Application No. PCT/US2022/016695, dated May 13, 2022, (11 pages), European Patent Office, Rijswijk, Netherlands.

*Primary Examiner* — Kharye Pope
(74) *Attorney, Agent, or Firm* — ALSTON & BIRD LLP

(57) ABSTRACT

Computer program products, methods, systems, apparatus, and computing entities are provided for providing targeted content to a user. In one embodiment, a method is provided comprising: determining whether a phone number for a digital call involving a mobile device or a user computing entity is one of a plurality of target phone numbers; responsive to determining that the phone number is one of the target phone numbers, identifying content control rules associated with the phone number; responsive to identifying the content control rules, identifying actions to be carried out in accordance with the content control rules, wherein at least one of the actions involves providing the targeted content via a call companion interface available through the mobile device or the user computing entity in response to an occurrence of an idle instance experienced by the user on the digital call while the digital call is connected.

8 Claims, 7 Drawing Sheets

(51) Int. Cl.
*G10L 25/78* (2013.01)
*H04L 12/66* (2006.01)
*H04M 1/72445* (2021.01)
*H04M 1/72454* (2021.01)
*H04M 3/42* (2006.01)
*H04M 5/00* (2006.01)

(52) U.S. Cl.
CPC ... *H04M 1/72445* (2021.01); *H04M 1/72454* (2021.01); *H04M 2201/42* (2013.01); *H04M 2203/10* (2013.01); *H04M 2203/2038* (2013.01); *H04M 2203/256* (2013.01)

(58) Field of Classification Search
CPC .. H04M 3/4878; H04M 3/4931; H04M 15/90; H04M 2201/38; H04M 15/56; H04M 15/55; H04M 2215/202; H04M 3/42102; H04M 7/006; H04M 3/42076; H04M 3/42093; H04M 2203/2038; H04M 1/72484; H04M 3/42119; H04L 65/1069; H04L 65/1104; H04L 12/1439; H04L 65/1046; H04L 65/103; H04L 65/1016; H04L 61/10; H04L 2012/6472; H04L 63/10; H04L 61/4535; H04L 2101/38; H04L 2101/385; H04L 2101/65; H04L 61/106; H04L 67/14
See application file for complete search history.

(56) References Cited

U.S. PATENT DOCUMENTS

| | | | | |
|---|---|---|---|---|
| 8,548,135 B1* | 10/2013 | Lavian | ............ | H04M 3/493 |
| | | | | 379/142.06 |
| 9,437,186 B1* | 9/2016 | Liu | ............ | G10L 15/22 |
| 11,451,666 B1* | 9/2022 | Biswas | ............ | G10L 25/06 |
| 11,817,091 B1* | 11/2023 | Singh | ............ | G10L 15/22 |
| 2004/0122941 A1* | 6/2004 | Creamer | ............ | H04M 3/42059 |
| | | | | 709/224 |
| 2006/0019751 A1* | 1/2006 | Garcia | ............ | G07F 17/32 |
| | | | | 463/42 |
| 2007/0269031 A1* | 11/2007 | Honig | ............ | H04M 3/5238 |
| | | | | 379/142.01 |
| 2008/0152116 A1* | 6/2008 | Sylvain | ............ | H04M 3/42136 |
| | | | | 379/216.01 |
| 2009/0245479 A1* | 10/2009 | Surendran | ............ | H04M 3/4878 |
| | | | | 379/70 |
| 2010/0134587 A1* | 6/2010 | Grasso | ............ | H04M 3/4938 |
| | | | | 348/14.01 |
| 2010/0306392 A1* | 12/2010 | Fell, Jr. | ............ | H04L 69/28 |
| | | | | 709/228 |
| 2012/0230483 A1* | 9/2012 | Bouzid | ............ | H04M 3/5158 |
| | | | | 379/201.02 |
| 2014/0192139 A1* | 7/2014 | Li | ............ | H04L 51/10 |
| | | | | 348/14.07 |
| 2015/0237189 A1* | 8/2015 | Schultz | ............ | H04W 4/16 |
| | | | | 455/414.1 |
| 2015/0282074 A1* | 10/2015 | Szabo | ............ | H04W 76/27 |
| | | | | 370/311 |
| 2017/0265065 A1 | 9/2017 | Meriaz et al. | | |
| 2017/0330557 A1* | 11/2017 | Pattan | ............ | G06F 40/10 |
| 2022/0172723 A1* | 6/2022 | Tendolkar | ............ | G10L 25/78 |

* cited by examiner

CALL CONTROL FOR PROVIDING TARGETED CONTENT

CROSS REFERENCE TO RELATED APPLICATIONS

This application claims priority to U.S. Provisional Patent Application No. 63/200,141 filed Feb. 17, 2021, the contents of which are hereby incorporated by reference in their entireties.

BACKGROUND

The number of applications resident on mobile devices and other computing entities has exploded. With that said, users may decide to download and install applications for third parties regardless of what functionality is available through the applications. Irrespective of whether third party applications are resident on a particular mobile device or computing entity, third parties may desire to direct or control various content that may be provided through applications or other interfaces on mobile devices and computing entities associated with inbound and/or outbound calls from and to the third parties.

BRIEF SUMMARY

In general, embodiments of the present disclosure provide methods, apparatus, systems, computing devices, computing entities, and/or the like for providing targeted content to a user. In accordance with one aspect of the present disclosure, a method is provided. In various embodiments, the method comprises: determining, via one or more processors, whether a phone number for a digital call involving at least one of a mobile device or a user computing entity is one of a plurality of target phone numbers; responsive to determining that the phone number is one of the plurality of target phone numbers, identifying, via the one or more processors, one or more content control rules associated with the phone number; responsive to identifying the one or more content control rules, identifying, via the one or more processors, one or more actions to be carried out in accordance with the one or more content control rules, wherein at least one of the one or more actions involves providing the targeted content via a call companion interface available through the at least one of the mobile device or the user computing entity in response to an occurrence of an idle instance experienced by the user while on the digital call; identifying, via the one or more processors, the occurrence of the idle instance experienced by the user while on the digital call; and responsive to identifying the occurrence of the idle instance, providing, via the one or more processors, the targeted content for display via the call companion interface available through the at least one of the mobile device or the user computing entity.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: determine whether a phone number for a digital call involving at least one of a mobile device or a user computing entity is one of a plurality of target phone numbers; responsive to determining that the phone number is one of the plurality of target phone numbers, identify one or more content control rules associated with the phone number; responsive to identifying the one or more content control rules, identify one or more actions to be carried out in accordance with the one or more content control rules, wherein at least one of the one or more actions involves providing the targeted content via a call companion interface available through the at least one of the mobile device or the user computing entity in response to an occurrence of an idle instance experienced by the user while on the digital call; identify the occurrence of the idle instance experienced by the user while on the digital call; and responsive to identifying the occurrence of the idle instance, provide the targeted content for display via the call companion interface available through the at least one of the mobile device or the user computing entity.

In accordance with yet another aspect of the present disclosure, a computer program product is provided. In particular embodiments, the computer program product includes a non-transitory computer storage medium having instructions stored therein. The instructions being configured to cause one or more processors to at least perform operations configured to: determine whether a phone number for a digital call involving at least one of a mobile device or a user computing entity is one of a plurality of target phone numbers; responsive to determining that the phone number is one of the plurality of target phone numbers, identify one or more content control rules associated with the phone number; responsive to identifying the one or more content control rules, identify one or more actions to be carried out in accordance with the one or more content control rules, wherein at least one of the one or more actions involves providing the targeted content via a call companion interface available through the at least one of the mobile device or the user computing entity in response to an occurrence of an idle instance experienced by the user while on the digital call; identify the occurrence of the idle instance experienced by the user while on the digital call; and responsive to identifying the occurrence of the idle instance, provide the targeted content for display via the call companion interface available through the at least one of the mobile device or the user computing entity.

As detailed further herein, in some embodiments, the one or more processors are executing on the at least one of the mobile device or the user computing entity. In some embodiments, the one or more processors are executing on a call management computing entity (or other appropriate computing entity) remote from the at least one of the mobile device or the user computing entity. In some embodiments, the apparatus comprises the at least one of the mobile device or the user computing entity. In some embodiments, the apparatus comprises a call management computing entity (or other appropriate computing entity) remote from the at least one of the mobile device or the user computing entity.

In particular embodiments, identifying the occurrence of the idle instance may involve determining that the idle instance satisfies a configurable idle threshold, and responsive to the idle instance satisfying the configurable idle threshold, identifying the occurrence of the idle instance. In some embodiments, the configurable idle threshold may be an amount of idle time and determining the idle instance satisfies the configurable idle threshold may involve identifying a start of the idle instance, and determining the user experiencing the idle instance from the start of the idle instance for the amount of idle time. For instance, in one embodiment, determining the user experiencing the idle instance from the start of the idle instance for the amount of idle time may involve detecting an absence of the user speaking on the digital call from the start of the idle instance for the amount of idle time via at least one of artificial intelligence or an audio feature of the at least one of the digital call. In other embodiments, identifying the occurrence of the idle instance may involve processing one or more features of the at least one of the digital call using a machine learning model to generate a prediction of the occurrence of the idle instance, and identifying the occurrence of the idle instance based at least in part on the prediction.

The targeted content may be of various forms as described further herein. For instance, in particular embodiments, the targeted content may be a webpage, and the call companion interface comprises a browser through which the webpage is accessed. Here, the targeted content may be displayed by causing the browser resident on the at least one of the mobile device or the user computing entity to launch to a web address (e.g., URL) for the webpage to access the webpage. In other embodiments, the targeted content may be application-enabled content, and the call companion interface is an application resident on the at least one of the mobile device or the user computing entity. Here, the targeted content may be displayed via the call companion interface by providing the application-enabled content to the at least one of the mobile device or the user computing entity and causing the application to launch to display the application-enabled content. Yet, in other embodiments, providing the targeted content for display via the call companion interface may involve providing a hyperlink through a communication channel that is selectable through the at least one of the mobile device or user computing entity to access the targeted content, and responsive to a selection of the hyperlink, causing the call companion interface to launch to display the targeted content.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION

Figure 1:
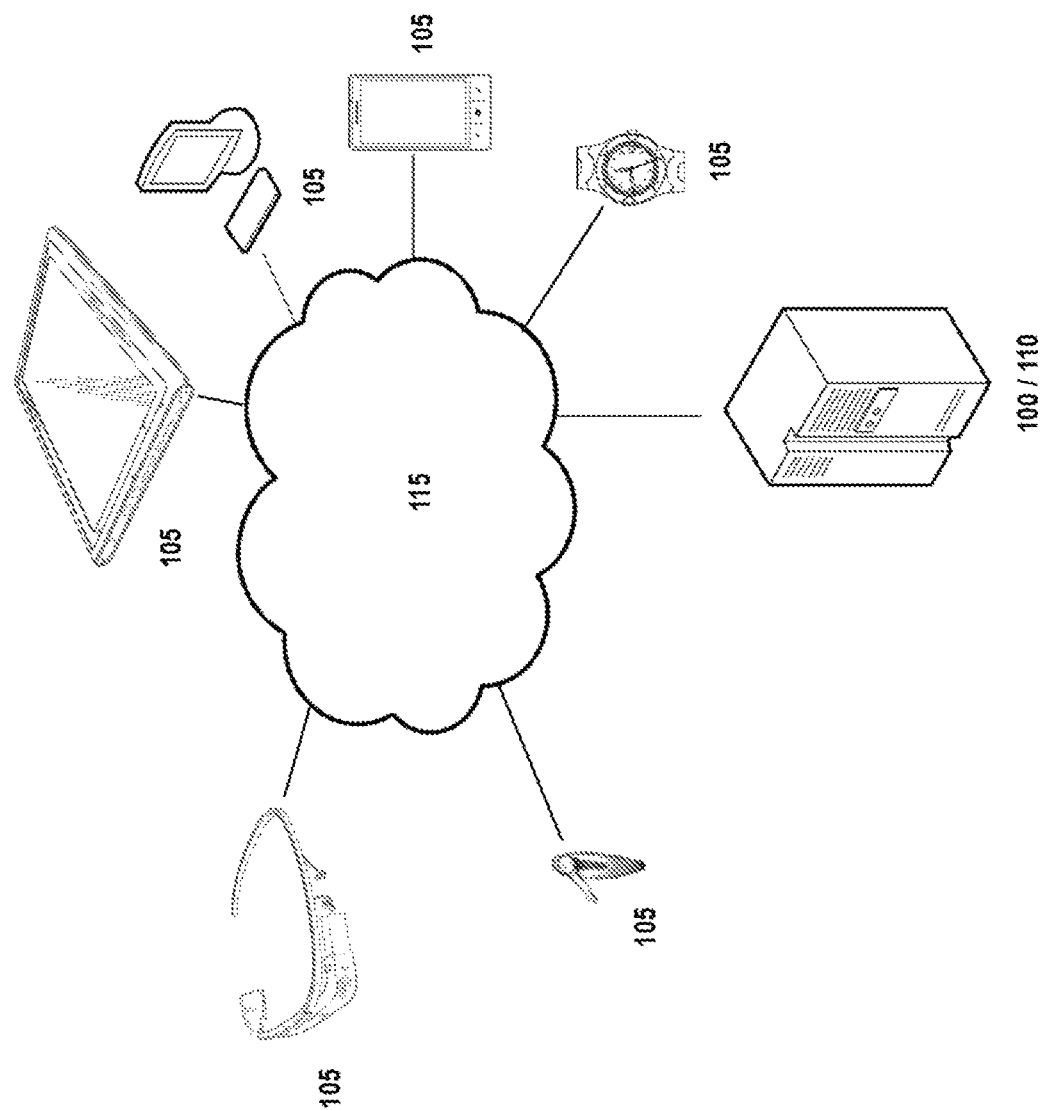
FIG. 1 is a diagram of a system architecture that can be used to practice embodiments of the present disclosure.

Various embodiments of the present disclosure are now described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. General Overview

Embodiments of the present disclosure provide methods, systems, apparatus, computer program products, and/or the like for enabling a third party to provide targeted content over a separate companion interface in conjunction with particular digital calls. A digital call can be a voice call, video call, and/or the like. For example, the digital call may be a voice call provided via call functionality available through a phone device, a voice or video call provided via a communication application such as Facetime®, Duo®, Zoom, etc., a web-based call provided via a web-based utility, and/or the like. Accordingly, in various embodiments, a third party may register a particular phone number as a target number and provide one or more content control rules. Here, the content control rules may identify a call companion interface through which targeted content is provided, the targeted content, and/or one or more conditions for providing the targeted content via the call companion interface. The targeted content may include various forms of content such as webpages, videos, images, files, tables, other forms of communication and/or the like. In addition, the conditions for providing the targeted content may involve mechanisms such as triggering events and/or detection of conditions such as detection of a party on a call being idle. Accordingly, it should be understood that a variety of content control rules and mechanisms used in identifying when targeted content should be provided may be implemented, as appropriate for the application. Various aspects of embodiments of the present disclosure will now be described.

II. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of an exemplary embodiment of a system architecture that may be used in accordance with various embodiments of the present disclosure. As shown in FIG. 1, the architecture may include one or more call management computing entities 100, one or more mobile devices 105, one or more mobile device communications networks (comprising mobile switching centers (MSCs) 110, service control points (SCPs) 115, and/or the like), one or more third party computing entities 120, one or more user computing entities 125, and one or more networks 130. It should be noted that any of these devices/entities can be a caller/calling device/entity (the device/entity originating a call) and/or a callee device/entity (the device/entity receiving a call). Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, various embodiments are not limited to this particular architecture.

1. Call Management Computing Entity

Figure 2:
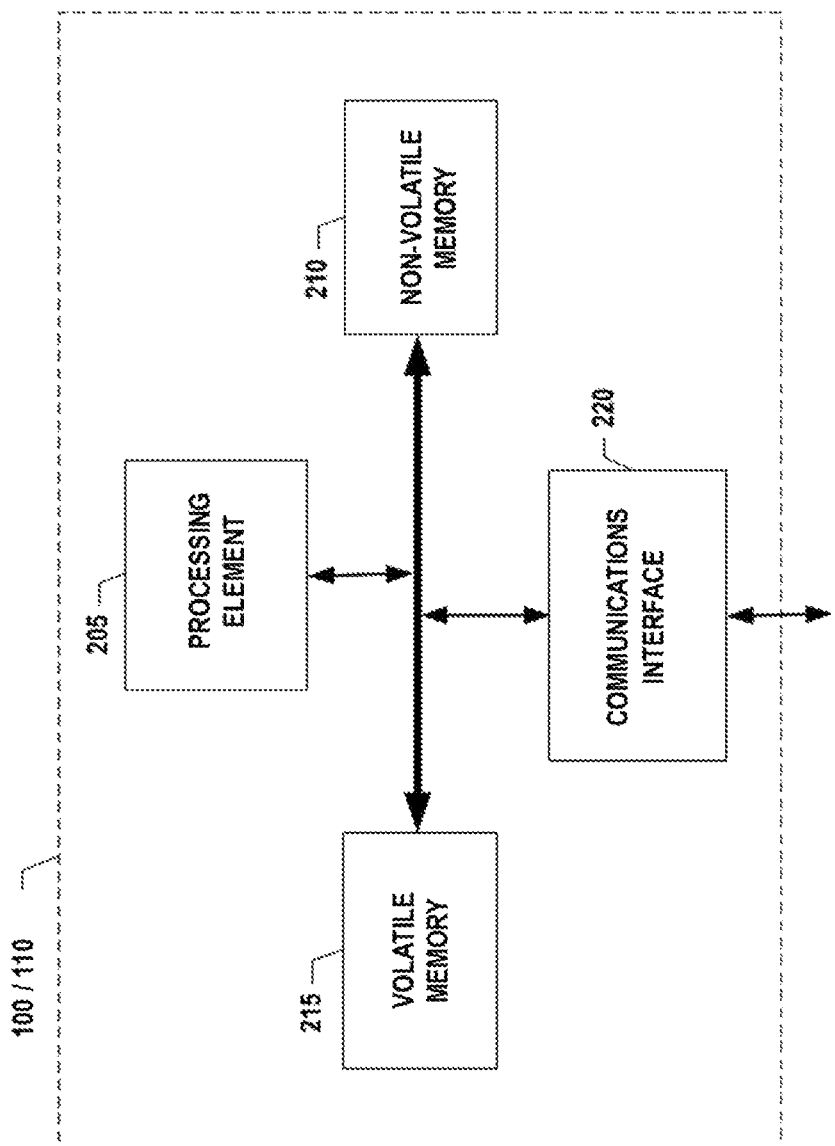
FIG. 2 is an exemplary schematic diagram of a computing entity that can be used to practice embodiments of the present disclosure.

FIG. 2 provides a schematic representative of a call management computing entity 100 that can be used in conjunction with embodiments of the present disclosure. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the call management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the call management computing entity 100 may include or be in communication with one or more processing elements 205 (also referred to as processors, processing circuitry, and/or similar terms used herein interchangeably) that communicate with other elements within the call management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the call management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the call management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the call management computing entity 100 with the assistance of the processing element 205 and operating system.

As indicated, in one embodiment, the call management computing entity 100 may also include one or more communications interfaces 220 for communicating with or various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the call management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, Bluetooth protocols, wireless universal serial bus (USB) protocols, and/or any other wireless protocol. Via such communication protocols, the call management computing entity 100 can communicate with the mobile device 105, the third party computing entity 120, and/or various other computing entities.

Although not shown, the call management computing entity 100 may include or be in communication with one or more input elements, such as a keyboard input, a mouse input, a touch screen/display input, audio input, pointing device input, joystick input, keypad input, and/or the like. The call management computing entity 100 may also include or be in communication with one or more output elements (not shown), such as audio output, video output, screen/display output, motion output, movement output, and/or the like.

As will be appreciated, one or more of the call management computing entity's 100 components may be located remotely from other call management computing entity 100 components, such as in a distributed system. Furthermore, one or more of the components may be combined and additional components performing functions described herein may be included in the call management computing entity 100. Thus, the call management computing entity 100 can be adapted to accommodate a variety of needs and circumstances.

2. Exemplary Mobile Device

Figure 3:
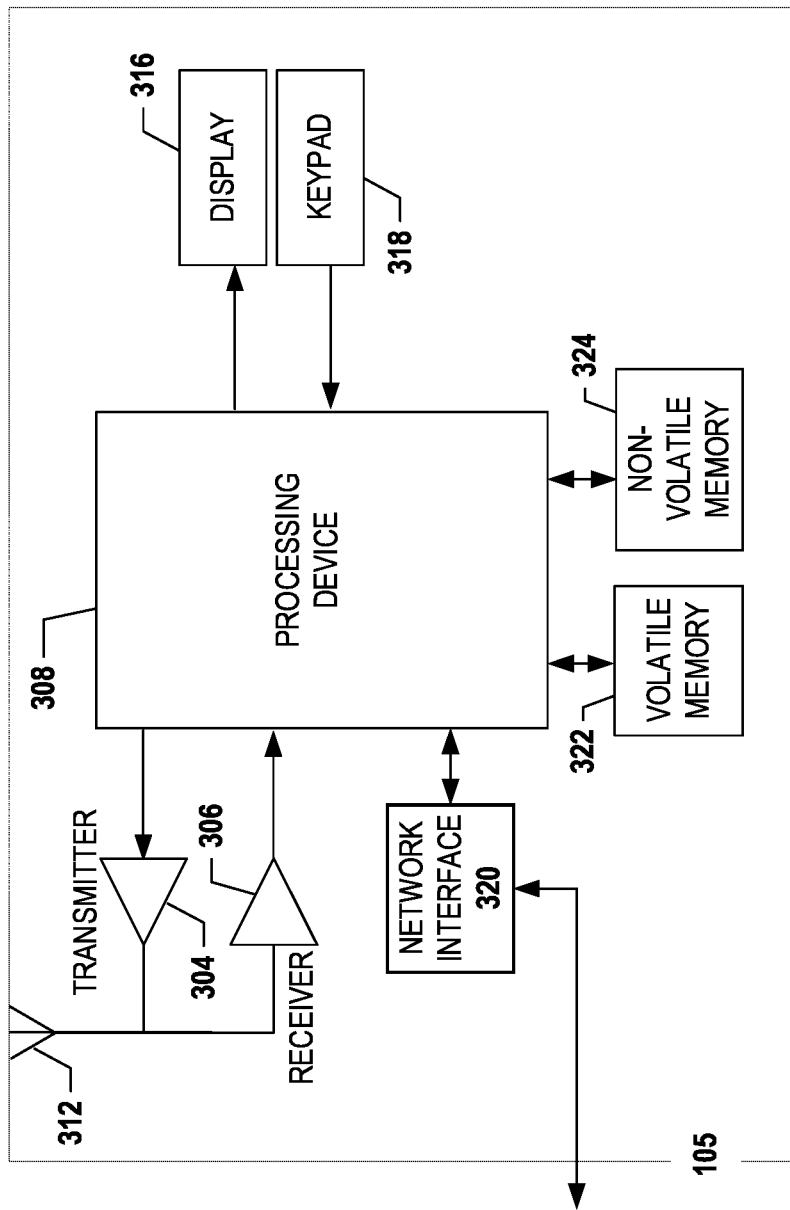
FIG. 3 is an exemplary schematic diagram of a mobile device the can be used to practice embodiment of the present disclosure.

FIG. 3 provides an illustrative schematic representative of a mobile device 105 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the mobile device 105 can include an antenna 312, a transmitter 304 (e.g., radio), a receiver 306 (e.g., radio), and a processing element 308 (such as those described above with regard to the call management computing entity 100) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the mobile device 105 may be capable of operating with one or more air interface standards, communication protocols, modulation types, and access types. More particularly, the mobile device 105 may operate in accordance with any of a number of wireless communication standards and protocols, such as those described above with regard to the call management computing entity 100. In a particular embodiment, the mobile device 105 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, Bluetooth, USB, and/or the like. Via such communication protocols, the mobile device 105 can communicate with the call management computing entity 100, the third party computing entity 120, and/or various other computing entities.

Via these communication standards and protocols, the mobile device 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile device 105 can also download changes, add-ons, and updates, for instance, to its firmware, software (e.g., including executable instructions, applications, program modules), and operating system. In one embodiment, the mobile device 105 may be executing an application initiating program that is resident on the mobile device 105. In one embodiment, the application initiating program may comprise, be associated with, or be in communication with an application initiating database. The application initiating program may also be associated with or be in communication with the call management computing entity 100 that comprises an application initiating database.

According to one embodiment, the mobile device 105 may include location determining aspects, devices, modules, functionalities, and/or similar words used herein interchangeably. For example, the mobile device 105 may include outdoor positioning aspects, such as a location module adapted to acquire, for example, latitude, longitude, altitude, geocode, course, direction, heading, speed, universal time (UTC), date, and/or various other information/data.

In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the mobile device's 105 position in connection with a variety of other systems, including cellular towers, Wi-Fi access points, and/or the like. Similarly, the mobile device 105 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile device 105 may also comprise a user interface (that can include a display 316 coupled to a processing element 308) and/or a user input interface (coupled to a processing element 308). For example, the user interface may be a user application, browser, graphical user interface, and/or similar words used herein interchangeably executing on and/or accessible via the mobile device 105 to interact with and/or cause display of targeted content, as described herein. The user input interface can comprise any of a number of devices allowing the mobile device 105 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 105.

In another embodiment, the mobile device 105 may include one or more components that are functionally similar to those of the call management computing entity 100, as described in greater detail above.

3. Exemplary Mobile Device Communications Networks

In various embodiments, the mobile device communications networks may include one or more MSCs 110, SCPs 115, and/or the like for call creation, management, and termination. The MSCs 110 and SCPs 115 may include one or more components that are functionally similar to those described above with respect to the call management computing entity 100 and/or the mobile device 105. For example, in one embodiment, entities in the mobile device communications networks may each include one or more (1) processing elements, (2) memory storage areas, (3) network interfaces, (4) antennae, (5) transceivers, and/or (6) other components. In one embodiment, although not shown, the MSC 110 may be connected to one or more radio access networks (RAN), including one or more one or more base station controllers (BSC) and one or more base transceiver stations (BTS). As will be recognized, the mobile device communications networks may support a variety of network types (e.g., wired, wireless, and/or the like) and various communications standards and protocols (e.g., UMTS, CDMA2000, 1×RTT, WCDMA, TD-SCDMA, LTE, E-UTRAN, EVDO, HSPA, HSDPA, Wi-Fi, WiMAX, UWB, Customized Application of Mobile Enhanced Logic (CAMEL), Session Initiation Protocol (SIP), and/or the like).

4. Exemplary Third Party Computing Entity

A third party may be an individual, a family, a company, an organization, an entity, a department within an organization, a representative of an organization and/or person, and/or the like. In various embodiments, each third party computing entity 120 may include one or more components that are functionally similar to those of the call management computing entity 100 and/or the mobile device 105. For example, each third party computing entity 120 may include one or more processing elements, one or more display device/input devices (e.g., including user interfaces), volatile and non-volatile storage or memory, and/or one or more communications interfaces. This may enable to the third party computing entity 120 to communicate with various other computing entities, such as call management computing entities 100, mobile devices 105, and/or various other computing entities. These architectures are provided for exemplary purposes only and are not limiting to the various embodiments. The term computing entity may refer to one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions described herein.

It should also be understood that the third party computing entity 120 may serve as the call management computing entity 100 in particular embodiments. For example, a third party may implement various embodiments of the disclosure within its own systems and/or environment. Therefore, in these particular embodiments, the third party computing entity 120 may perform the functionality of the call management computing entity 100 as detailed herein.

5. Exemplary User Computing Entity

As detailed further herein, a user may make use of a user computing entity 125, similar to a user making use of a mobile device 105. In various embodiments, each user computing entity 125 may include one or more components that are functionally similar to those of the call management computing entity 100 and/or the mobile device 105. For example, each user computing entity 125 may include one or more processing elements, one or more display device/input devices (e.g., including user interfaces), volatile and non-volatile storage or memory, and/or one or more communications interfaces. This may enable to the user computing entity 125 to communicate with various other computing entities, such as call management computing entities 100, third party computing entity 120, and/or various other computing entities. In addition, the user computing entity 125 may include a softphone, which may or may not be connected to a headset. The softphone may serve as a virtual phone implemented by an application program executing on the user computing entity 125. Accordingly, the softphone may enable a user to engage in digital calls. These architectures are provided for exemplary purposes only and are not limiting to the various embodiments. The term computing entity may refer to one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions described herein.

6. Additional Exemplary Entities

Although not shown, embodiments of the present disclosure may include one or more origination switches, one or more Internetwork Packet Exchanges (IPXs), one or more destination switches, one or more billings systems (e.g., visited operator billing computing entities, clearinghouse billing computing entities, record processing computing entities, and home operator billing computing entities), and one or more public switch networks (PSTNs). Each of these entities may have one or more of the above-described components, such as (1) processing elements, (2) memory, (3) network interfaces, (4) transceivers, and/or (5) various other components. As will be recognized, each of these entities may support a variety of network types and various communications standards and protocols.

IV. Exemplary System Operation

Figure 4:
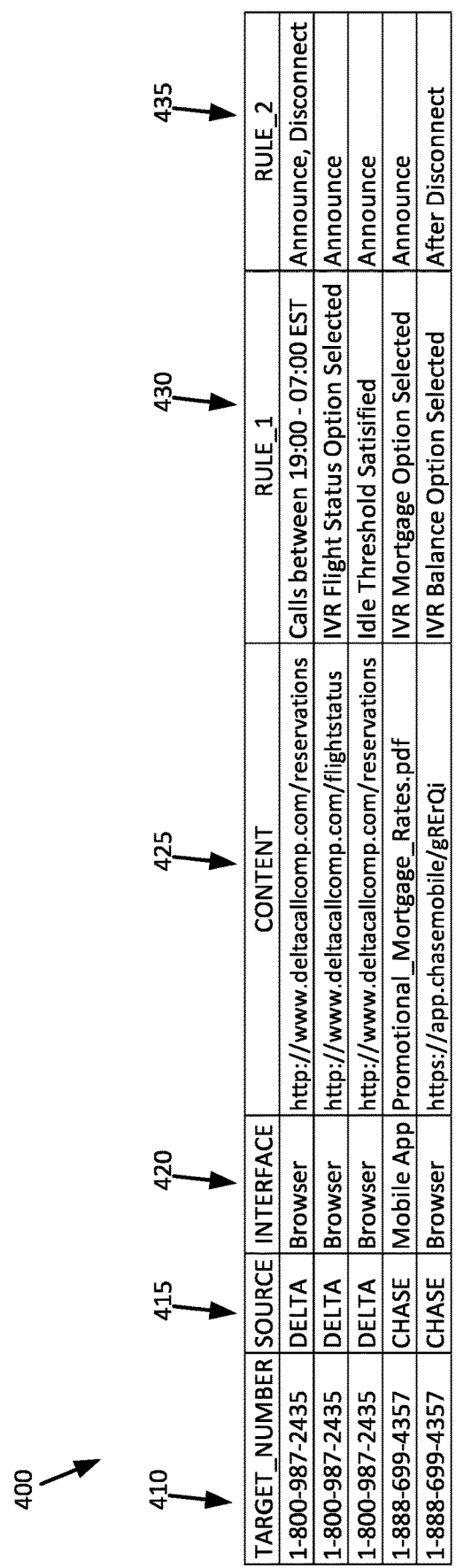
FIG. 4 is a data structure for storing phone numbers (e.g., target phone numbers), associated targeted content, and content control rules that can be used in accordance with various embodiments of the present disclosure.
Figure 5:
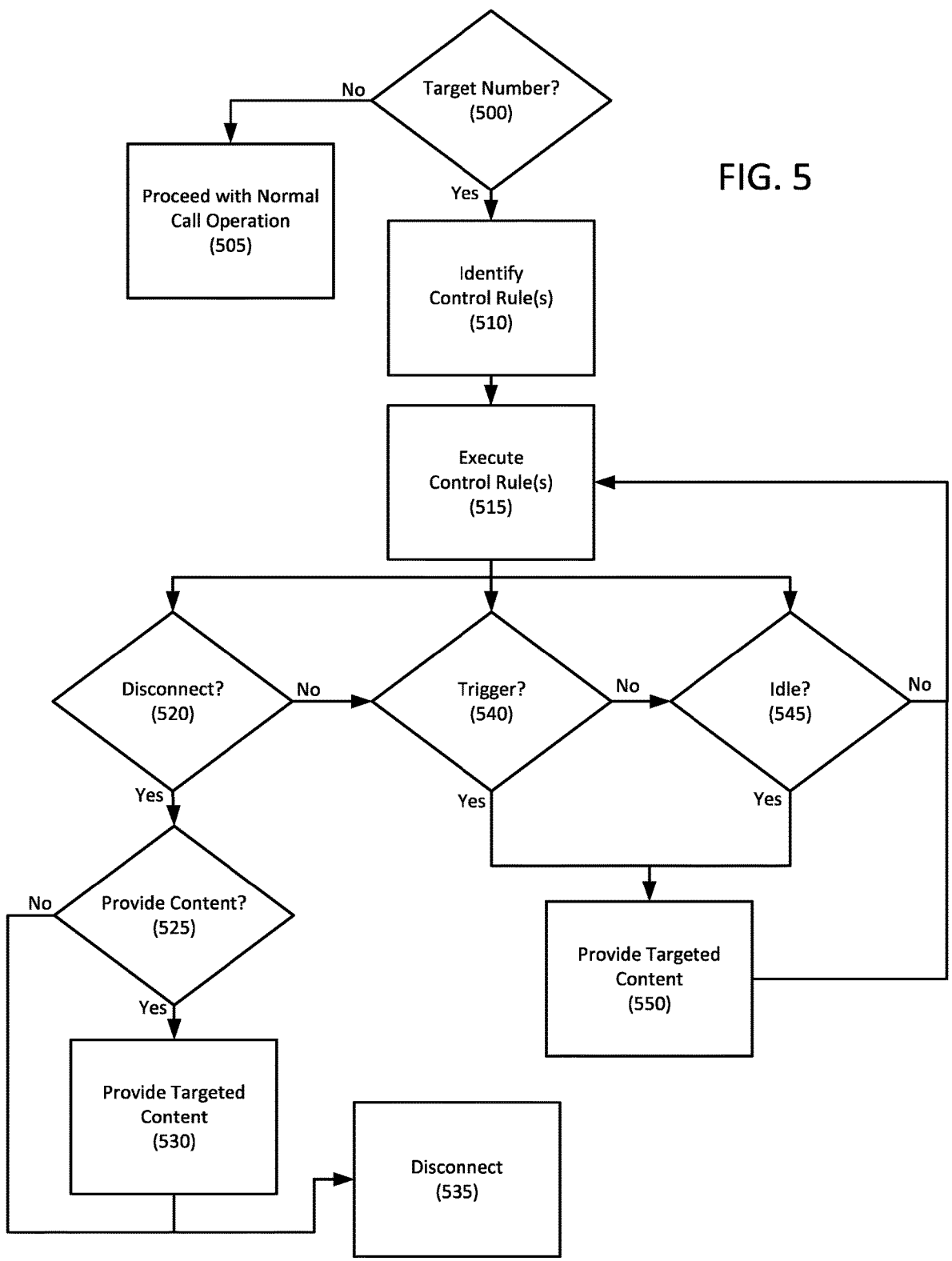
FIG. 5 is a flowchart illustrating operations and processes that can be used in accordance with various embodiments of the present disclosure.
Figure 6:
FIGS. 6 and 7 show targeted content provided in accordance with various embodiments of the present disclosure.
Figure 7:
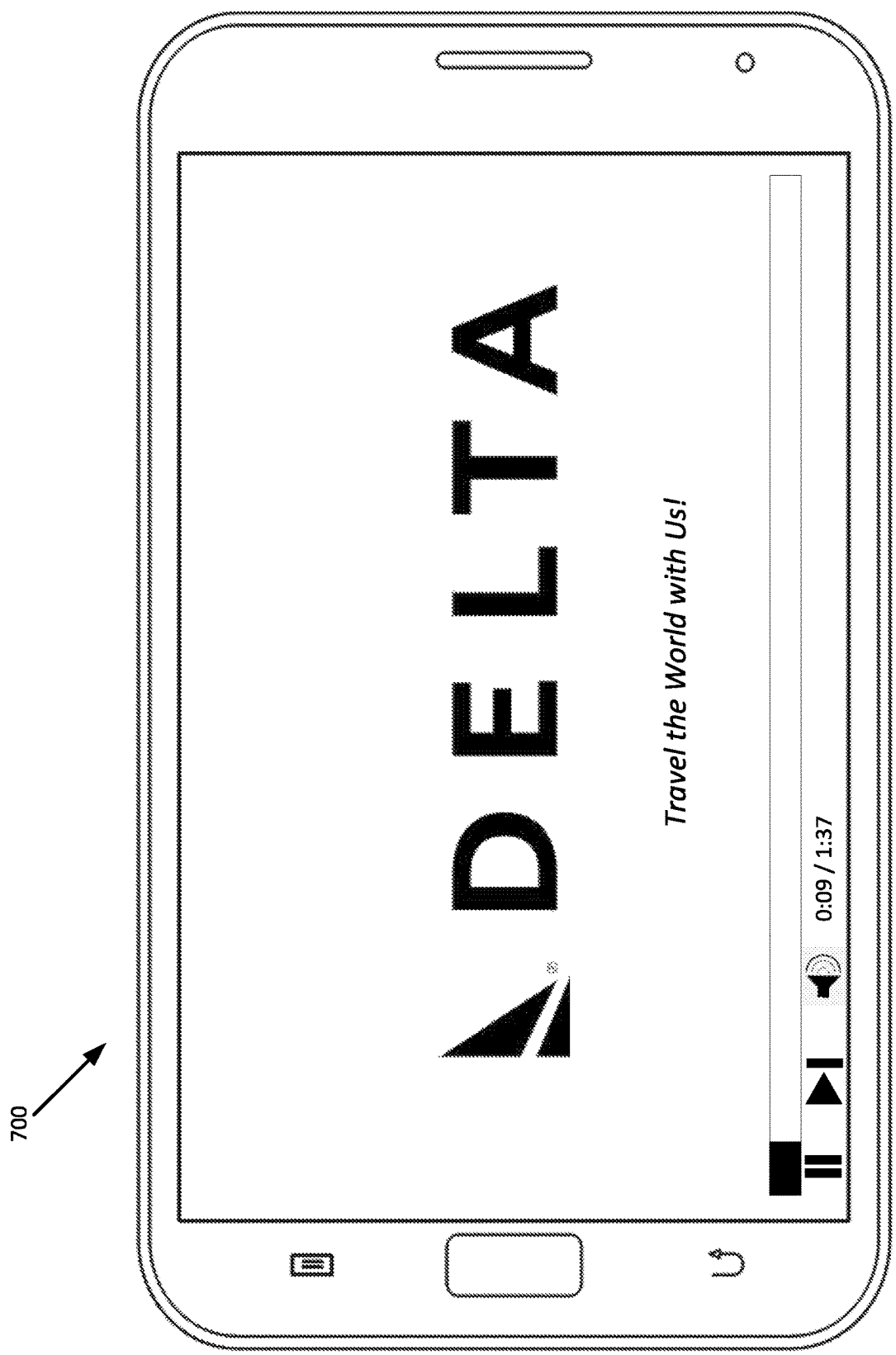

Reference will now be made to FIGS. 4-7. FIG. 4 is an example of a data structure that may be used in accordance with various embodiments of the present disclosure. FIG. 5 is a flowchart illustrating operations and processes that may be performed for providing targeted content through a call companion interface based at least in part on inbound or outbound phone numbers and/or content control rules according to various embodiments of the disclosure. FIGS. 6 and 7 show examples of targeted content provided via call companion interfaces in accordance with various embodiments of the present disclosure.

1. Registration

In one embodiment, to take advantage of the features described herein, a third party such as a company or organization may need to register for services with a call management computing entity 100. The services provided by the call management computing entity 100 may be provided on a fee basis, a subscription basis, a pay-per-use basis, and/or the like. As will be recognized, a variety of other approaches and techniques can be used to adapt to various needs and circumstances. For example, as previously discussed, a third party may implement the functionality of the call management computing entity 100 (or entity similar thereof) within its own system(s) without the need of an external entity to provide the services of the call management computing entity 100 (e.g., the third party computing entity 120 may serve as the call management computing entity 100 in various embodiments).

As part of or after registration, the third party (e.g., operating a third party computing entity 120) may provide one or more phone numbers (e.g., one or more target phone numbers) associated with the third party and for which the third party would like to provide targeted content simultaneous to, during, and/or after calling or receiving a call from such numbers. The target phone numbers provided by the third party may be stored by the call management computing entity 100 and/or may be stored locally on one or more mobile devices 105 and/or user computing entities 125 of users. For example, Delta, the airline, may be registering and while registering, provide a target phone number of 1-800-987-2435. In addition, Chase bank may be registering and while registering, provide a target phone number of 1-888-699-4357. As will be recognized, a third party is not limited to providing a single phone number; rather, multiple phone numbers (e.g., target phone numbers) may be registered. Further, the phone numbers may include country codes, area codes, region codes, and/or the like.

In addition to the one or more target phone numbers, the third party may also identify targeted content to be provided through a call companion interface as described further herein to users of mobile devices 105 and/or user computing entities 125 through which the users are placing calls (e.g., Voice over Internet Protocol (VoIP) calls). For instance, such content may identify webpages, text, images, videos, files, tables, application functionality, other forms of communication, and/or the like. In particular embodiments, the call companion interface through which the targeted content is provided on the users' mobile devices 105 and/or user computing entities 125 serves as an additional source of content separate from the calls. Accordingly, the targeted content may be provided through the call companion interface to users who are actively and/or were engaged in digital calls. For example, targeted content may be provided through: (1) one or more web addresses (e.g., uniform resource locators (URLs) or uniform resource identifiers (URIs)) to which a browser serving as a call companion interface on a user's mobile device 105 and/or user computing entity 125 can be directed to enabled display of one or more webpages; (2) an application resident on a user's mobile device 105 and/or user computing entity 125 that can be initiated to serve as a call companion interface; and/or (3) a communication channel available on a user's mobile device 105 and/or user computing entity 125 that enables the user to initiate a call companion interface. Accordingly, the targeted content may be provided to users of the mobile devices 105 and/or user computing entities 125 (e.g., executing a targeted content program) who are calling or receiving calls from target numbers.

For example, Delta's target phone number 1-800-987-2435 may be used for calls associated with making flight reservations. For a mobile device 105 and/or user computing entity 125 calling or receiving a call from 1-800-987-2435, Delta may want to initiate targeted content provided through a call companion interface in the form of an Internet browser resident on a user's mobile device 105 and/or user computing entity 125 that is initialized, launched, opened, and/or the like as a source of content for the user in addition to content received over the call. For instance, Delta may identify a web address (e.g., www.deltacallcomp.com/reservations) used to initialize the call companion interface in the form of the browser to provide the targeted content via one or more webpages. In addition, Chase bank's target phone number 1-888-699-4357 may be used for customer service calls with existing customers. For a mobile device 105 and/or user computing entity 125 calling or receiving a call from 1-888-699-4357, Chase may want to provide targeted content in the form of a document, image, and/or video as a source of content for the user in addition to content received over the call. Here, Chase may identify the targeted content as a document file, image file, and/or video file compatible for display via a call companion interface in the form of an application resident on a user's mobile device 105 and/or user computing entity 125 that can be initiated, launched, opened, and/or the like to display the document file, image file, and/or video file. Furthermore, Chase may also want to provide targeted content by providing a mechanism through which a user can access the targeted content via a call companion interface as an additional source of content. For example, Chase may want to provide the targeted content via a hyperlink that is sent in a text message and/or email to a user's mobile device 105 and/or user computing entity 125 that when selected by the user, launches a call companion interface (e.g., an Internet browser) to access the targeted content (e.g., one or more webpages).

Accordingly, the targeted content may take various forms, provide various information and/or functionality, and/or be provided through various call companion interfaces. For example, the targeted content may provide functionality to perform a task such as book airline tickets. Here, the targeted content may be provided to a user through a call companion interface in the form of a browser on the user's mobile device 105 and/or user computing entity 125 enabling access to one or more webpages with the functionality as a result of the user expressing on a call with a Delta representative that he or she would like to book a flight. In another instance, the content may provide a digital coupon that can be used for a purchase made by a user. Here, the digital coupon may be provided through a call companion interface accessible via an embedded link sent in a text message and/or email to the user's mobile device 105 and/or user computing entity 125 as a result of the user calling a target phone number for a retailer to gather information on a particular product offered for sale by the retailer. In this instance, the digital coupon may be sent in the text message and/or email once the user has completed the call to entice the user to purchase the product. Readers will appreciate third parties can establish several different types of targeted content to be provided through different types of call companion interfaces in light of this disclosure.

In addition to the one or more target phone numbers and targeted content, the third party in various embodiments may also define content control rules for providing the targeted content to users. For example, Delta may define flight reservation content that provides functionality to allow a caller to make or change a flight reservation (e.g., a webpage providing such functionality). Here, Delta may define a content control rule indicating that for any mobile device 105 and/or user computing entity 125 that calls 1-800-987-2435 between 19:00-07:00 Eastern Standard Time, Delta wants to provide targeted content through a call companion interface in the form of an Internet browser on the mobile device 105 and/or user computing entity 125. This may allow Delta to provide an additional mechanism to users who are calling to make or change flight reservations during non-business hours to do so via the targeted content provided through the call companion interface when customer service representatives may not be available to handle such calls. Accordingly, by providing targeted content using this form of a call companion interface, Delta may be able to handle customer needs using alternative options in lieu of calls involving customer service representatives for a variety of purposes.

In another example, Chase bank may define targeted content on promotional information on different banking products being offered by the bank that can be provided via a call companion interface in the form of a banking application resident on a user's mobile device 105 and/or user computing entity 125. In this example, Chase may define a content control rule indicating that for any mobile device 105 and/or user computing entity 125 that calls or receives a call from 1-888-699-4357 in which the user of the mobile device 105 and/or user computing entity 125 has downloaded and registered Chase's banking application, Chase wants to provide the targeted content presenting the promotional information that can be displayed through the banking application on the mobile device 105 and/or user computing entity 125.

In particular embodiments, the content control rules may indicate providing targeted content based at least in part on conditions observed during the call. For example, if a user has called to discuss different mortgage rates currently being offered by the bank and has selected an option to speak to a customer service representative about the rates, then the selection of the option may identify a condition to have targeted content directed to promotional information on different mortgage products be provided to the user. In another example, a user may have called and spoken with a technical support representative about an issue the user is having with a product. Here, the routing of the call to the technical support representative may serve as a condition for providing targeted content to the user in the form of a survey on the technical support representative's effectiveness in addressing the user's issue. Accordingly, content controls rules may define certain triggering events that serve as conditions for providing targeting content.

In addition, content control rules may define other conditions for providing targeted content. For example, a content control rule may indicate a conclusion of a call as a condition for providing targeted content to a user. In another illustration, detection of idle time (e.g., an idle instance) experienced by a user during a call may indicate a condition for providing targeted content. For example, an idle instance may represent a time when a user has been placed on hold during a call to wait for a customer service representative to become available. Third parties may define content control rules to take advantage of these idle instances since such instances may identify times where users have the attention to interact and/or view targeted content. In addition, the content control rules may define time frames (e.g., times of day, days of the week, holidays, and/or the like) in which the targeted content is to be provided or other circumstances defined by a third party. Furthermore, the content control rules may define actions to be carried out in addition to providing targeted content such as establishing, terminating/blocking, or suspending calls, providing announces that targeted content is available, and/or the like.

As previously noted, a third party can define multiple content control rules for controlling the delivery and access to targeted content using various types of call companion interfaces. For example, delivering targeted content may involve a call companion interface in the form of a browser resident on a user's mobile device 105 and/or user computing entity 125, a call companion interface in the form of an application resident on a user's mobile device 105 and/or user computing entity 125, and/or a call companion interface that is launched via a feature found on the user's mobile device 105 and/or user computing entity 125 such as a hyperlink in a text message and/or email. Depending on the embodiment, the call companion interface may be structured for displaying targeted content using different configurations. For example, the call companion interface may be structured so that the interface is displayed on a portion of a screen on the user's mobile device 105 and/or user computing entity 125. In some embodiments, the call companion interface may be configured so that the user can size the interface as desired. In some embodiments, the call companion interface may include one or more display components such as page/browser tabs, windows, view panes, and/or the like that can be used in displaying different targeted content. Accordingly, the one or more display components may be provided side-by-side on non-overlapping potions of the call companion interface, may be provided as overlapping (e.g., superimposed over one another) on the call companion interface, may be provided in tabular form, and/or the like. In addition, the display components may be displayed in various sizes and dimensions with respect to the call companion interface. Further, the display components may be display statically and/or dynamically such as pop-up windows.

In addition, in some embodiments, the targeted content may be provided to the user through multiple call companion interfaces displayed at different times or at virtually the same time side-by-side or with one interface superimposed over a portion of or an entire second interface. For example, in one embodiment, multiple call companion interfaces may be displayed as superimposed over one another (or portion thereof) in a cascading fashion. Further, the call companion interface(s) may be displayed in various sizes and dimensions, as well as statically or dynamically. Furthermore, the call companion interface may be displayed via a device (e.g., mobile device 105 and/or user computing entity 125) that is separate from the device being used to handle the call. Thus, depending on the embodiment, the targeted content may be provided, displayed, and/or positioned in a variety of different ways on one or more call companion interfaces having one or more display components that are accessed on the same or different device than the device being used to handle the call.

Furthermore, in particular embodiments, a call companion interface used for displaying targeted content may provide functionality with respect to the targeted content. For example, the call companion interface may present controls (e.g., play, stop, rewind, fast forward buttons) through which the user can interact with and/or control viewing of the targeted content. In addition, the call companion interface may be used concurrently with interfaces for other applications. For example, the call may involve a video call being conducted through a video display interface. Accordingly, the call companion interface may be overlaid on the video display interface (e.g., overlaid on a portion of the video display interface), may be transparent with respect to the video display interface, may have functionality to allow the user to toggle back and forth between the two interfaces, and/or the like. In some embodiments, the call companion interface may be configured to integrate the call into the interface along with the targeted content. Those of ordinary skill in the art can envision other configurations of the call companion interface that may be utilized in light of this disclosure.

In particular embodiments, the target phone numbers, targeted content, call companion interfaces, content control rules, and/or the like can be stored locally in a data structure such as, for example, a database on the mobile devices 105 and/or user computing entities 125 of users. Such a structure 400 is shown in FIG. 4. Here, the structure 400 includes various data entities (e.g., fields) storing data on targeted content for different third parties. Specifically, the structure 400 includes a data entity 410 used in storing the target phone numbers for the different third parties. As previously noted, these target phone numbers can be used in identifying what calls may involve providing targeted content to users on the calls. In addition, the structure 400 includes a data entity 415 for storing the third party (e.g., source) associated with each of the target phone numbers. Further, the structure 400 includes a data entity 420 for identifying the call companion interface used in providing the targeted content, as well as a data entity 425 identifying the targeted content. For example, the data entity 425 may include a URL for the targeted content in the form of a webpage, the targeted content itself (e.g., an image file), some type of identifier (e.g., a pointer) for retrieving the targeted content, and/or the like. Finally, the structure 400 includes data entities 430, 435 defining the content control rules for delivering the associated targeted content. Those of ordinary skill in the art should understand that other configurations of the data structure 400 may be used in other embodiments.

In some embodiments, the call management computing entity 100 (e.g., in communication with the mobile devices 105 and/or user computing entities 125 of users) may update the data structure 400 on the mobile devices 105 and/or user computing entities 125 regularly, periodically, continuously, and/or in response to certain triggers. In other embodiments, the data structure 400 can be stored remotely from the mobile devices 105 and/or user computing entities 125 by the call management computing entity 100. In these particular embodiments, the mobile devices 105 and/or user computing entities 125 may need to communicate in real time or near real time with the call management computing entity 100 to determine/identify whether targeted content should be provided. As will be recognized, a variety of other approaches and techniques can be used to adapt to various needs and circumstances.

2. Targeted Content Delivery

In various embodiments, targeted content may be provided to a user as a result of the user placing or receiving a call on a mobile device 105 and/or user computing entity 125 associated with a target phone number. Here, the mobile device 105 and/or user computing entity 125 (e.g., executing a targeted content program) can determine/identify whether the corresponding inbound or outbound number is one of a plurality of target phone numbers (Block 505 of FIG. 5). This may require that the user navigates one or more menus, dialogue boxes, prompts, screens, verbal commands, and/or the like to place the outbound call and/or receive an inbound call. For instance, as the user dials a phone number via the mobile device 105 and/or user computing entity 125 (e.g., executing a targeted content program) or otherwise initiates a call, the mobile device 105 and/or user computing entity 125 can determine/identify whether the dialed number is one of a plurality of target phone numbers listed in the data structure 400. Such an operation may be performed as the user types or once the user, for example, clicks, pushes, selects, and/or other words used herein interchangeably sends via the mobile device 105 and/or user computing entity 125. To determine/identify whether the number is one of the plurality of target phone numbers, the mobile device 105 and/or user computing entity 125 can access the local data structure 400 to determine/identify whether a corresponding match exists.

In other embodiments, the mobile device 105 and/or user computing entity 125 can transmit or originate the inbound call via an appropriate computing entity in communication with the mobile device 105 and/or user computing entity 125 (e.g., call management computing entity 100, mobile device communications network, callee device/entity, and/or the like) to make such determinations. In these embodiments, the appropriate computing entity (e.g., call management computing entity 100, mobile device communications network, callee device/entity, and/or the like) in communication with the mobile device 105 and/or user computing entity 125 can make such determinations and carry out the content control rules using a variety of signaling and notification approaches and techniques, including push notifications to an application on the mobile device 105 and/or user computing entity 125. A variety of other approaches and techniques can be used to adapt to various needs and circumstances. For instance, as will be recognized, the same can be applied to calls that are being received by the mobile device 105 and/or user computing entity 125.

In particular embodiments, if an inbound or outbound number is determined/identified not be a target phone number, then the mobile device 105 and/or user computing entity 125 (or appropriate computing entity) can allow the call to proceed with normal call operation (Block 505 of FIG. 5). Such normal call operation may include, for example, connecting (e.g., establishing) the call between the parties. As will be recognized, a variety of other approaches and techniques can be used to adapt to various needs and circumstances.

However, if the inbound or outbound call corresponds to a number that is determined to be a target phone number, then the mobile device 105 and/or user computing entity 125 (or appropriate computing entity) can identify and/or deliver targeted content to the user through a call companion interface associated with the mobile device 105 and/or user computing entity 125 or associated with a mobile device 105 and/or user computing entity 125 separate than the mobile device 105 and/or user computing entity 125 being used to handle the call. For example, the call companion interface may be in the form of a browser residing on the user's mobile device 105 and/or user computing entity 125 that is initialized to a web address. In another example, the call companion interface may be in the form of an application residing on the user's mobile device 105 and/or user computing entity 125. Such a configuration allows the targeted content to be provided to the user in concert with the call. In other words, the targeted content can be provided through the call companion interface to enhance and/or supplement the call as the user is interacting on the call and/or once the call has been completed. In some instances, the call may be disconnected, and the targeted content is delivered to the user as an alternative to conducting the call.

For example, the user may have called a target phone number provided by an airline (e.g., Delta) that can be used to check the status of a flight. Here, the user may have placed the call during non-business hours when customer service representatives are not available. Therefore, a content control rule may be defined that indicates the call should be terminated and targeted content in the form of one or more webpages having functionality to check flight status that are provided through a call companion interface in the form of a browser on the user's mobile device 105 and/or user computing entity 125 so that the user may then look up the status of the flight. While in another example, the user may be given an option to have the targeted content (e.g., the functionality to check flight status via the one or more webpages) provided and the call disconnected. In this particular embodiment, a content control rule may be defined to inquiry from the user whether he or she would like to have the targeted content provided in lieu of waiting on the call for a customer service representative.

Still, in another example, targeted content may be provided to the user once the call has normally completed and is disconnected. For example, the user may have conversed with a technical support representative during the call to discuss an issue the user is having with a product. After the call has been completed and the user hangs up the call, targeted content in the form of a survey may be provided to the user so that he or she may furnish feedback on the technical support representative's effectiveness during the call. Here, the targeted content may be provided by sending the user a hyperlink in a text message and/or email that the user can select to launch a call companion interface to take the survey.

In other instances, targeted content may be provided to the user during a call when the user is determined to be idle (e.g., during an idle instance). For example, the user may be placed in a waiting queue (e.g., placed on hold) to wait for an agent (e.g., customer service representative) to become available to speak with the user. Here, the targeted content may be provided to the user while the user is waiting in the queue. The data provided may be dynamic to include the updated wait time, for example. In one embodiment, the wait time may be an estimated wait time by using various mathematical operations and functions to determine the estimate, such as number of callers, types of calls, number of available agents, time of day, etc. In another embodiment, the wait time may be a predicted wait time by using one or more machine learning models. For example, the various features may be input into the one or more machine learning models, such as the number of callers, types of calls, number of available agents, time of day, etc. These features may be used by the one or more machine learning models to generate a predicted output of the likely wait time.

In some instances, the targeted content may be configured to attempt to handle the user's reason for the call, and thus eliminate the user's need to speak with the agent. For example, the user may have called to check the status of a purchase order that the user made online. In this example, targeted content in the form of functionality accessed through a browser and/or an application resident on the user's mobile device 105 and/or user computing entity 125 may be provided that allows the user to look up the status of the purchase order without the need of an agent's assistance.

Furthermore, targeted content may be delivered to the user during a call based at least in part on an occurrence of some triggering event (e.g., condition). For example, the user may be navigating through an interactive voice response system (IVR), selects a particular option, and as a result, targeted content may be provided to the user based at least in part on the selected option. For instance, the user may have selected an option to place a sales order, and as a result, a digital catalog of products may be provided to the user through a call companion interface so that the user may view what products are available for order. In another example, the user may be conversing with a technical support representative on an issue the user is having with a particular product. Here, the user and/or technical support representative may identify the product through some mechanism such as speech analytics/recognition and a corresponding content control rule may indicate that a digital manual for the product should be provided to the user during the call so that the user can reference the manual as he or she and the technical support representative work through the issue. Other types of triggering events can be used in various embodiments as those of ordinary skill in the art can envision in light of this disclosure.

Returning to FIG. 5, after determining/identifying that the inbound or outbound number (e.g., a dialed shortened number) is a target phone number, the mobile device 105 and/or user computing entity 125 (or appropriate computing entity) can identify the applicable content control rules (Block 510 of FIG. 5). As previously discussed, the content control rules may define a variety of actions that are to be performed by the mobile device 105 and/or user computing entity 125 (or appropriate computing entity) with respect to providing targeted content to the user. For example, such actions may involve initializing a call companion interface to use for providing targeted content such as opening a browser or a new tab in a browser to an identified webpage or opening an application resident on the mobile device 105 and/or user computing entity 125, terminating and/or blocking the call, providing the user with an option for having targeted content delivered, sending a mechanism to access targeted content through an alternative communication channel, and/or the like.

After identifying the one or more applicable content control rules, the mobile device 105 and/or user computing entity 125 (or appropriate computing entity) executes the applicable content control rule(s) accordingly (Block 515 in FIG. 5). Here, executing the applicable content control rule(s) may involve monitoring conditions, events, actions, and/or the like that may indicate targeted content should be provided to the user through a call companion interface. Therefore, in particular embodiments, the mobile device 105 and/or user computing entity 125 (or appropriate computing entity) determines whether a condition, event, action associated with an applicable content control rule indicates disconnecting the call (Block 520 of FIG. 5). As previously noted, the appropriate content control rule may indicate to provide targeted content to the user in lieu of conducting the call or once the call has been completed. For example, an applicable content control rule may indicate that for a call placed to and/or received from the target phone number during a certain time window, a browser should be opened to a call companion interface in the form of a browser initialized to a web address and the call disconnected. In another example, an applicable content control rule may indicate that for a call fielded by a customer service representative, targeted content in the form of a survey should be delivered to the user once the call has concluded. Yet, in another example, an applicable content control rule may indicate that targeted content should be delivered to the user and once the user accepts delivery of the targeted content and/or begins to interact with the targeted content through a call companion interface, then the call should be disconnected.

Therefore, if the mobile device 105 and/or user computing entity 125 (or appropriate computing entity) determines the call should be disconnected, then the mobile device 105 and/or user computing entity 125 (or appropriate computing entity) determines whether targeted content should be provided to the user based at least in part on the call being disconnected (Block 525 in FIG. 5). If so, then the mobile device 105 and/or user computing entity 125 (or appropriate computing entity) has the targeted content provided to the user (Block 530 in FIG. 5). As previously discussed, the targeted content is provided to the user in various embodiments through a call companion interface. The call companion interface may be provided in various forms to the user, include a split screen with the call interface, superimposed on the call interface, and/or the like. Accordingly, the applicable content control rule may identify the call companion interface that is to be used in providing the targeted content to the user. For example, the content control rule may indicate that a hyperlink that can be selected by the user to open a call companion interface to access the targeted content should be sent to the user. Here, the hyperlink may be sent to the user's mobile device 105 and/or user computing entity using some type of channel of communication such as, for example, a text message or email message. At that point, the mobile device 105 and/or user computing entity 125 (or appropriate computing entity) disconnects/terminates the call (Block 535 in FIG. 5).

Accordingly, the mobile device 105 and/or user computing entity 125 (or appropriate computing entity) may disconnect/terminate the call using various mechanisms. For example, the mobile device 105 and/or user computing entity 125 (or appropriate computing entity) may simply drop the call (hang up), send a signal to a call management computing entity 100 and/or mobile device communications network to terminate the call, and/or the like.

In particular embodiments, the mobile device 105 and/or user computing entity 125 (or appropriate computing entity) may also determine whether a triggering event identified by an applicable content control rule has occurred (Block 540 in FIG. 5). If so, then the mobile device 105 and/or user computing entity 125 (or appropriate computing entity) provides the targeted content associated with the applicable content control rule and triggering event to the user via a call companion interface (Block 550 in FIG. 5).

Accordingly, depending on the embodiment, a triggering event may involve any number of different conditions, actions, acts, occurrences, circumstances, and/or the like. For example, a content control rule may be defined for Chase bank that indicates that if a user, who is interacting with an IVR, selects an option to listen to information on mortgage products offered by the bank, then targeted content listing the most recent mortgage rates is to be provided via a call companion interface in the form of an application resident on the user's mobile device 105 and/or user computing entity 125. While in another instance, the content control rule may indicate the targeted content is to be pushed to the application and an announcement is provided to the user instructing the user to open the application to see the most recent mortgage rates. Therefore, as a result of the content control rule defining the triggering event and the user selecting the option in the IVR to listen to information on the mortgage products, the targeted content displaying the most recent mortgage rates is provided to the user.

Further, in particular embodiments, the mobile device 105 and/or user computing entity 125 (or appropriate computing entity) may determine whether the user is experiencing (or may experience) an idle instance as defined by an applicable content control rule (Block 545 in FIG. 5). If so, then the mobile device 105 and/or user computing entity 125 (or appropriate computing entity) provides the targeted content identified by the applicable content control rule through a call companion interface to the user (Block 550 in FIG. 5).

As previously noted, such content control rules may be implemented in some embodiments to provide the user with supplemental content and/or replacement content through a call companion interface in addition to and/or in lieu of the content that may be obtained via the call. Thus, in various instances, the user may use the call companion interface in concert with the call and/or in place of the call. For example, the user may have been placed on hold, waiting to speak with a customer service representative. In this example, the user may then be provided with targeted content through a call companion interface after being placed on hold for a certain period of time that may replace the user's need to continue to remain on hold to speak with a customer service representative. That is to say, the targeted content may be provided via the call companion interface as an alternative to remaining on hold.

Here, in particular embodiments, the mobile device 105 and/or user computing entity 125 (or appropriate computing entity) may be configured to determine whether the idle instance for the user satisfies a configurable idle threshold. For example, the mobile device 105 and/or user computing entity 125 (or appropriate computing entity) may be configured to determine whether the amount of time the user has been idle satisfies a time threshold. Accordingly, depending on the embodiment, the mobile device 105 and/or user computing entity 125 (or appropriate computing entity) may identify whether the idle instance satisfies the configurable idle threshold using a number of different mechanisms.

For instance, in particular embodiments, the mobile device 105 and/or user computing entity 125 (or appropriate computing entity) may automatically implement a timer when a start of an idle instance is detected. For example, in one embodiment, the mobile device 105 and/or user computing entity 125 (or appropriate computing entity) may detect the start of the idle instance based at least in part on an occurrence of an event, such as when the user is placed in a hold queue. In another embodiment, the mobile device 105 and/or user computing entity 125 (or appropriate computing entity) may detect the start of an idle instance using artificial intelligence (e.g., speech analytics/recognition technology), audio features (e.g., absence of data packets for Voice over Internet Protocol (VoIP) call), and/or the like to detect silence on the call indicating the start of the idle instance. Yet, in another embodiment, the mobile device 105 and/or user computing entity 125 (or appropriate computing entity) may detect the start of an idle instance using some type of artificial intelligence (e.g., visual technology on a video call) to visually detect a user displaying inactivity/non-engagement (e.g., sitting stationary) while on the call.

In some embodiments, the mobile device 105 and/or user computing entity 125 (or appropriate computing entity) may make use of some type of machine learning model in predicting when an idle instance is occurring or may occur. For example, the machine learning model may be a supervised or unsupervised machine learning model trained to predict when the user is experiencing and/or is expected to experience an idle instance while on the call. For instance, the machine learning model may be based at least in part on a support vector machine and/or artificial neural network. Here, the machine learning model may be configured to process various inputs gathered while the user is on the call such as speech spoken by the user, images of the user, options selected by the user, workflow scripts executed during the call, and/or the like to predict the start of an idle instance or when an idle instance is expected to start. Predicting when an idle instance is expected to start can facilitate providing the targeted content to the user before the idle instance so that the content is available upon the idle instance beginning.

In addition, although not shown in FIG. 5, the mobile device 105 and/or user computing entity 125 (or appropriate computing entity) may be configured in some embodiments to provide the targeted content while the user is idle and then remove the content once the user is no longer idle. For example, the targeted content may involve displaying a video to the user via a call companion interface such as an application resident on the user's mobile device 105 and/or user computing entity 125 while the user is placed on hold waiting to speak with a customer service representative. Accordingly, once the call is taken off hold and connected with a customer service representative, the mobile device 105 and/or user computing entity 125 (or appropriate computing entity) may recognize a representative is now connected to the call (e.g., the representative's voice is detected on the corresponding voice channel of the call) and as a result, discontinue the video to indicate to the user that he or she has been connected with the customer service representative. In some embodiments, similar to predicting the start of an idle instance, a machine learning model may be used in predicting the end of an idle instance.

Accordingly, in various embodiments, the mobile device 105 and/or user computing entity 125 (or appropriate computing entity) may continue to execute the applicable content control rule(s) and in conjunction with the applicable content control rule(s), determine whether to disconnect the call, determine whether a triggering event has occurred, and/or determine whether the user is experiencing an idle instance to identify when targeted content should be provided to the user via a call companion interface. As previously mentioned, in particular instances, the call companion interface may work in concert with the call as another source of content for the user. Here, for example, the user may be instructed while on the call to engage with the call companion interface to be provided targeted content during and/or after the call. Depending on the circumstances, the user's mobile device 105 and/or user computing entity 125 (or appropriate computing entity) may launch, initiate, open, and/or the like the call companion interface automatically to provide the targeted content or the user may be instructed to do so. Further, the user may be instructed via the call (e.g., call interface) and/or the call companion interface to operate back and forth between the two to gather content as needed. For example, the user may be engaged in a video call and using a video display interface for the call. In this example, the user may then toggle back and forth between the video display interface for the call and the call companion interface while on the call. While in other instances, the call companion interface may be superimposed over a portion of the video display interface so that the user may view both at the same time. Those of ordinary skill in the art can envision various configurations of the call companion interface that can be used in light of this disclosure to facilitate providing targeted content to the user.

3. Third Party can Provide Targeted Content

In particular embodiments, in addition to an appropriate computing entity (e.g., call management computing entity 100, mobile device communications network, callee device/entity, and/or the like) providing instructions to mobile devices 105 and/or user computing entity 125 (e.g., executing a targeted content program) to carry out and/or perform certain actions, a third party computing entity 120 associated with a third party can also provide such instructions to the mobile devices 105 and/or user computing entity 125. For example, before, simultaneous to, during, and/or after a call associated with a mobile device 105 and/or user computing entity 125, the third party computing entity 120 can provide instructions to the user's mobile device 105 and/or user computing entity 125 (or separate device or computing entity) to initiate providing targeted content to the user. For example, assume a user calls Delta using his mobile device 105 and/or user computing entity 125. Delta can intercept the call, and provide instructions to the mobile device 105 and/or user computing entity 125 for carrying out the initiation of providing targeted content to the user through a call companion interface (e.g., launching a browser directed to a webpage through which the targeted content is provided). As will be recognized, the third party computing entity 120 and/or appropriate computing entity (e.g., call management computing entity 100, mobile device communications network, callee device/entity, and/or the like) can provide instructions to such mobile devices 105 and/or user computing entities 125 to carry out and/or perform a variety of actions before, simultaneous to, during, and/or after a call. As will be recognized, a variety of other approaches and techniques can be used to adapt to various needs and circumstances.

4. Example Targeted Content

FIGS. 6 and 7 provide examples of targeted content provided through a call companion interface in accordance with various embodiments of the disclosure. FIG. 6 is an example of targeted content provided as one or more webpages via a call companion interface in the form of a browser 600 resident on the user's mobile device 105 and/or user computing entity 125. Accordingly, the browser 600 may be initialized to provide the one or more webpages to the user as a result of the user placing a call to a third party (e.g., Delta) in which the call is associated with a target phone number. Here, the browser 600 provides the user with access to the one or more webpages having functionality that the user may exercise. FIG. 7 is an example targeted content in the form of a video for the user to view through a call companion interface such as an application 700 resident on his or her mobile device 105 and/or user computing entity 125. As previously mentioned, in particular embodiments, a third party (e.g., Delta) may provide such targeted content to the user in particular instances as supplemental content. For example, the third party may provide the video for the user to view while the user is waiting on hold to speak with a customer service representative. Such targeted content may keep the user entertained and/or engaged in the call while waiting on hold and idle.

V. Conclusion

Many modifications and other embodiments of the disclosure set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing targeted content to a user, the method comprising:
   determining, by one or more processors, whether a phone number for a digital call to a user device is one of a plurality of target phone numbers;
   responsive to determining that the phone number is one of the plurality of target phone numbers:
   (a) identifying one or more content control rules associated with the phone number; and
   (b) allowing the digital call to be established and enabling initiation of a call companion interface on the user device in accordance with the one or more content control rules, wherein one or more actions associated with one or more content control rules comprises providing the targeted content via the call companion interface available;

processing, by the one or more processors, one or more features of the digital call using a machine learning model to generate a prediction of a length of an idle instance;

responsive to the prediction of the length of the idle instance satisfying a configurable idle threshold, providing, by the one or more processors, the targeted content for display via the call companion interface;

identifying, by the one or more processors, an end of the idle instance experienced by the user of the user device during on the digital call; and responsive to identifying the end of the idle instance, stopping, by the one or more processors, to provide the targeted content for display via the call companion interface.

2. The method of claim 1, wherein the one or more processors are executing on a call management computing entity remote.

3. The method of claim 1, wherein the targeted content comprises application-enabled content, the call companion interface comprises an application resident on the user device, and providing the targeted content for display via the call companion interface comprises:

providing the application-enabled content; and causing the application to display the application-enabled content.

4. The method of claim 1, wherein providing the targeted content for display via the call companion interface comprises:

providing a hyperlink through a communication channel; and responsive to a selection of the hyperlink, causing the call companion interface to display the targeted content.

5. The method of claim 1 further comprising responsive to determining that the phone number is not one of the plurality of target phone numbers, allowing the digital call to follow normal call operation.

6. An apparatus for providing targeted content to a user, the apparatus comprising one or more processors and memory including program code, the memory and the program code configured to, with the one or more processors, cause the apparatus to at least:

determine whether a phone number for a digital call to a user device is one of a plurality of target phone numbers;

responsive to determining that the phone number is one of the plurality of target phone numbers:

(a) identifying one or more content control rules associated with the phone number; and (b) allowing the digital call to be established and enabling initiation of a call companion interface on the user device in accordance with the one or more content control rules, wherein one or more actions associated with one or more content control rules comprises providing the targeted content via the call companion interface available;

process one or more features of the digital call using a machine learning model to generate a prediction of a length of an idle instance;

responsive to the prediction of the length of the idle instance satisfying a configurable idle threshold, provide the targeted content for display via the call companion interface;

identify an end of the idle instance experienced by the user of the user device during on the digital call; and responsive to identifying the end of the idle instance, stop providing the targeted content for display via the call companion interface.

7. The apparatus of claim 6, wherein the apparatus comprises a call management computing entity remote.

8. A non-transitory computer storage medium comprising instructions for providing targeted content to a user, the instructions being configured to cause one or more processors to at least perform operations configured to:

determine whether a phone number for a digital call to a user device is one of a plurality of target phone numbers;

responsive to determining that the phone number is one of the plurality of target phone numbers:

(a) identifying one or more content control rules associated with the phone number; and (b) allowing the digital call to be established and enabling initiation of a call companion interface on the user device in accordance with the one or more content control rules, wherein one or more actions associated with one or more content control rules comprises providing the targeted content via the call companion interface available;

process one or more features of the digital call using a machine learning model to generate a prediction of a length of an idle instance;

responsive to the prediction of the length of the idle instance satisfying a configurable idle threshold, provide the targeted content for display via the call companion interface;

identify an end of the idle instance experienced by the user of the user device during on the digital call; and responsive to identifying the end of the idle instance, stop providing the targeted content for display via the call companion interface.

\* \* \* \* \*